US009866077B2

(12) United States Patent
Gontermann et al.

(10) Patent No.: US 9,866,077 B2
(45) Date of Patent: Jan. 9, 2018

(54) ROTOR AND RELUCTANCE MOTOR

(71) Applicant: KSB Aktiengesellschaft, Frankenthal (DE)

(72) Inventors: Daniel Gontermann, Frankenthal (DE); Jochen Schaab, Nieder-Olm (DE); Joachim Schullerer, Rheinzabern (DE)

(73) Assignee: KSB Aktiengesellschaft, Frankenthal (DE)

( * ) Notice: Subject to any disclaimer, the term of this patent is extended or adjusted under 35 U.S.C. 154(b) by 222 days.

(21) Appl. No.: 14/378,053

(22) PCT Filed: Jan. 31, 2013

(86) PCT No.: PCT/EP2013/051886
§ 371 (c)(1),
(2) Date: Aug. 11, 2014

(87) PCT Pub. No.: WO2013/117480
PCT Pub. Date: Aug. 15, 2013

(65) Prior Publication Data
US 2015/0015093 A1 Jan. 15, 2015

(30) Foreign Application Priority Data

Feb. 10, 2012 (DE) .................. 10 2012 202 017
Jan. 29, 2013 (DE) .................. 10 2013 201 353

(51) Int. Cl.
*H02K 1/24* (2006.01)
*H02K 1/02* (2006.01)
(Continued)

(52) U.S. Cl.
CPC ............... *H02K 1/02* (2013.01); *H02K 1/246* (2013.01); *H02K 15/02* (2013.01); *H02K 15/022* (2013.01);
(Continued)

(58) Field of Classification Search
CPC ........ H02K 1/27; H02K 1/276; H02K 1/2766; H02K 1/2773
See application file for complete search history.

(56) References Cited

U.S. PATENT DOCUMENTS 5,818,140 A * 10/1998 Vagati .................... H02K 29/03
310/152
5,893,205 A * 4/1999 McClelland ........... H02K 1/246
29/598
(Continued)

FOREIGN PATENT DOCUMENTS

DE 10 2009 054 599 A1 2/2011
EP 0 426 376 A2 5/1991
(Continued)

OTHER PUBLICATIONS

Translation of Written Opinion of the International Searching Authority (PCT/ISA/237) dated Sep. 12, 2014 (Six (6) pages).
(Continued)

*Primary Examiner* — Hanh Nguyen
*Assistant Examiner* — Leda Pham
(74) *Attorney, Agent, or Firm* — Crowell & Moring LLP

(57) ABSTRACT

A rotor for an electrical machine, in particular synchronous reluctance machine, is provided. The rotor is formed as a cylindrical structure having a magnetically soft element formed with an even number of salient magnetic poles openings for forming magnetic flux barriers. The openings are at least partially filled with a diamagnetic and/or paramagnetic medium and the diamagnetic and/or paramagnetic medium may axially and tangentially fix the magnetically soft element relative to the rotor. A method for producing such a rotor and apparatus using the rotor, including a reluctance motor, in particular a synchronous reluctance motor, that uses the rotor are provided.

13 Claims, 3 Drawing Sheets

(51) Int. Cl.
*H02K 15/02* (2006.01)
*H02K 19/06* (2006.01)
*H02K 19/10* (2006.01)
*H02K 15/12* (2006.01)

(52) U.S. Cl.
CPC .............. *H02K 15/12* (2013.01); *H02K 19/06* (2013.01); *H02K 19/103* (2013.01); *Y10T 29/49012* (2015.01)

(56) References Cited

U.S. PATENT DOCUMENTS

| | | | | |
|---|---|---|---|---|
| 6,194,804 | B1* | 2/2001 | Nashiki | H02K 1/246 310/166 |
| 6,849,983 | B2* | 2/2005 | Tajima | H02K 1/246 310/156.53 |
| 2003/0062791 | A1* | 4/2003 | Reiter, Jr. | B22F 7/06 310/156.53 |

FOREIGN PATENT DOCUMENTS

| | | |
|---|---|---|
| EP | 1 786 088 A2 | 5/2007 |
| JP | 8-340666 A | 12/1996 |
| JP | 2001-238418 A | 8/2001 |
| JP | 2009-44791 A | 2/2009 |
| WO | WO 2011/018119 A1 | 2/2011 |

OTHER PUBLICATIONS

International Search Report dated Jun. 3, 2014 with English translation (seven (7) pages).

German-language Written Opinion (PCT/ISA/237) dated Jun. 3, 2014 (six (6) pages).

English translation of Chinese-language Office Action issued in counterpart Chinese Application No. 201380008777.6 dated Jun. 27, 2017 (2 pages).

* cited by examiner

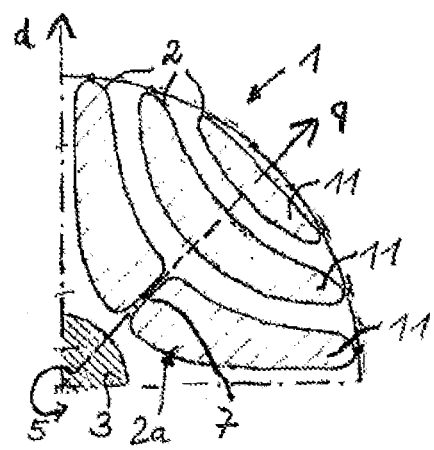
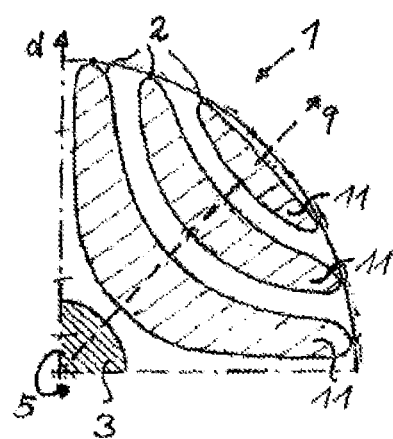
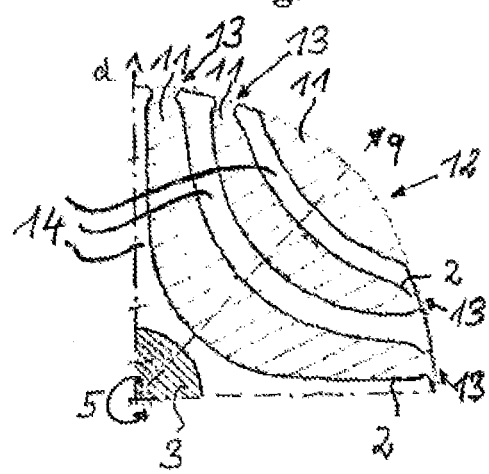
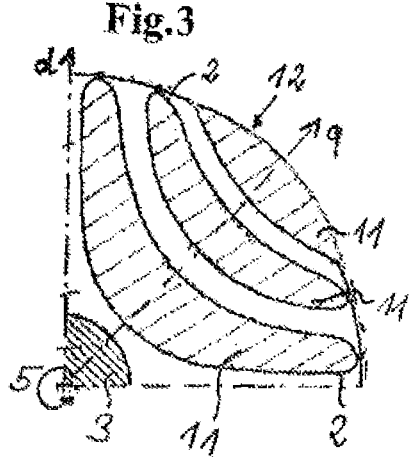

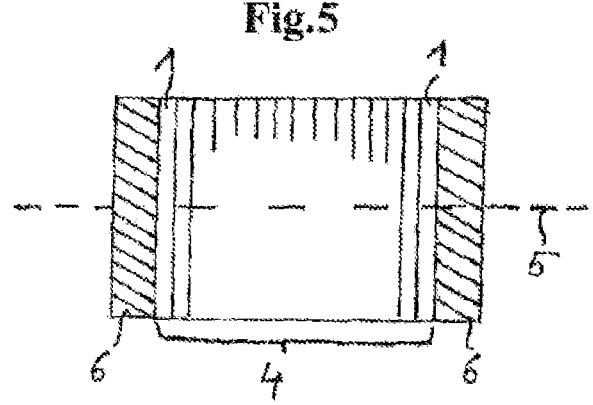
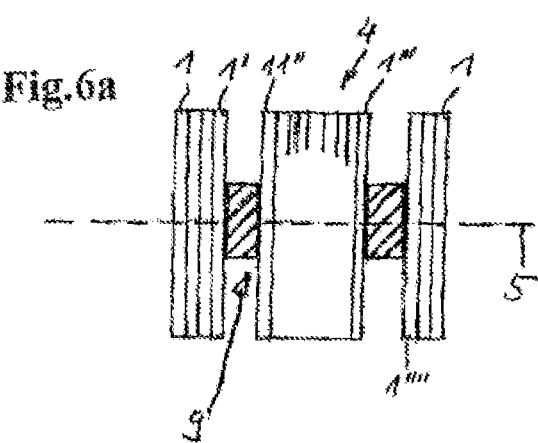
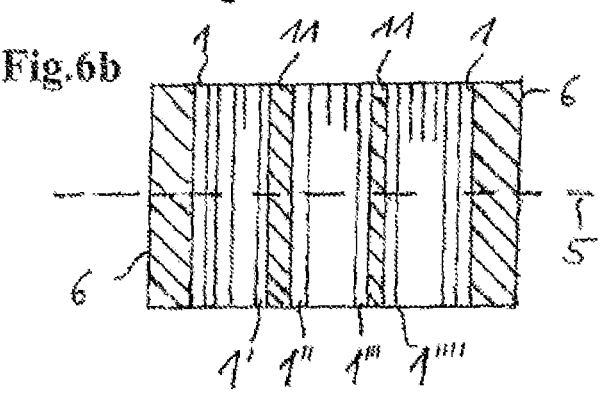

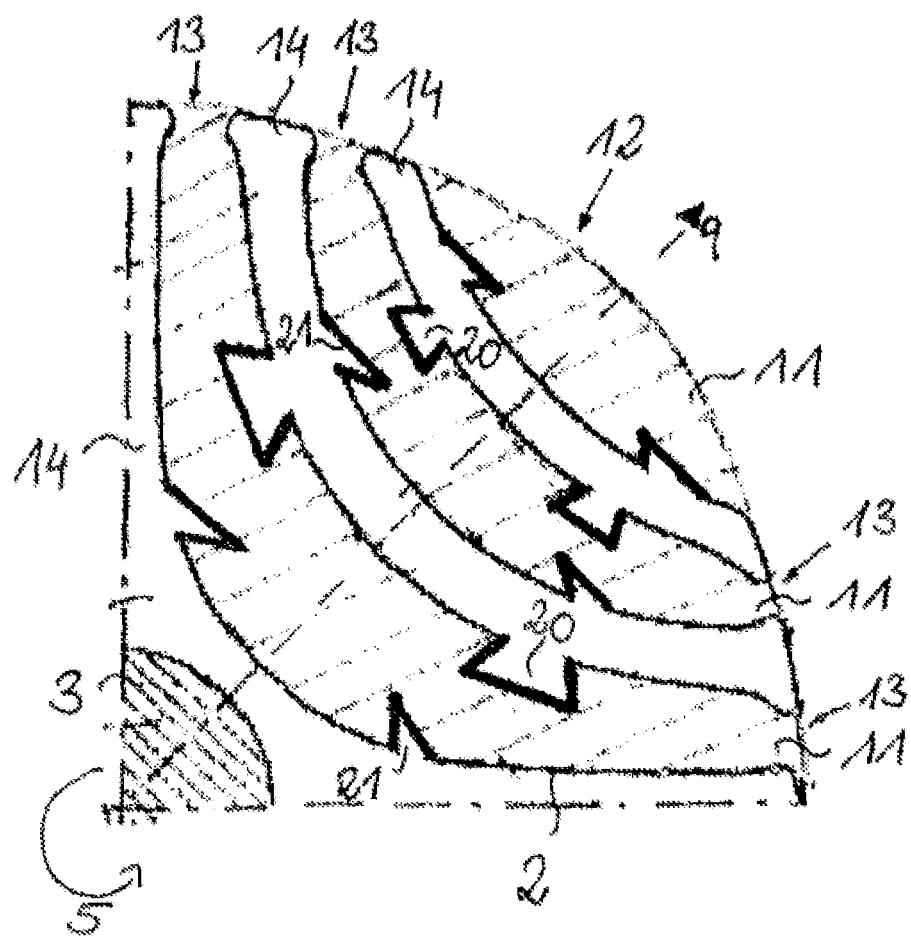

ROTOR AND RELUCTANCE MOTOR

This application is a National Phase of PCT International Application No. PCT/EP2013/051886, filed Jan. 31, 2013, which claims priority under 35 U.S.C. §119 from German Patent Application No. 10 2012 202 017.9, filed Feb. 10, 2012, and German Patent Application No. 10 2013 201 353.1, filed Jan. 29, 2013, the entire disclosures of which are expressly incorporated by reference herein.

BACKGROUND AND SUMMARY OF THE INVENTION

The invention relates to a rotor for a synchronous machine, in particular a reluctance machine, said rotor comprising a cylindrically constructed, magnetically soft element, wherein the magnetically soft element comprises cut-outs for the purpose of forming magnetic flux barriers that form an even number of salient magnetic poles.

Rotors for synchronous reluctance machines are typically equipped with a cylindrical, magnetically soft element that is arranged in a coaxial manner on the rotor axis. The magnetically soft element comprises flux conducting sections and also flux barrier sections for the purpose of forming at least one pole pair or rather gap pair and said flux conducting sections and flux barrier sections differ from one another to a varying degree of salient pole magnetic permeability. The section having a high magnetic conductivity, as is generally known, is characterized as the d-axis of the rotor, and the section having a comparably lower conductivity is characterized as the q-axis of the rotor. An optimal torque yield then occurs if the d-axis comprises an as high as possible magnetic conductivity and the q-axis comprises an as low as possible magnetic conductivity.

This object is often achieved by means of forming several cut-outs in the magnetically soft element along the q-axis and said cut-outs are filled with air, whereby the magnetic flux is inhibited in the direction of the q-axis and, as a consequence, the permeability decreases. The magnetically soft element that is constructed in this manner is subsequently attached to a rotor shaft and is fixed in an axial and also tangential manner.

The object of the present invention is to further develop a salient rotor of this type for a synchronous machine, in particular for a reluctance machine, in order to optimize the ratio of the salient pole magnetic permeabilities that differ from one another to a varying degree along the d-axis and the q-axis. Furthermore, the object of the invention is to further develop the construction of a rotor of this type in order in particular to simplify its production process.

For the purpose of achieving the object, it is provided that at least one cut-out within the cylindrically constructed magnetically soft element is filled at least in part with a diamagnetic or paramagnetic medium in lieu of air. In particular, as a result of selecting a diamagnetic medium in lieu of air, it is possible to increase the difference of the permeability between the q-axis and d-axis.

It is preferred that the cut-outs are entirely filled with the diamagnetic medium. In particular, it is possible for all cut-outs of the magnetically soft element to be entirely filled with the diamagnetic or paramagnetic medium. In this case, it is particularly advantageous if the entire diamagnetic or paramagnetic medium represents only a single component.

Furthermore, it is also possible to use the diamagnetic or paramagnetic medium in accordance with the invention as a constructive element for the purpose of constructing the rotor. In this case, the diamagnetic or paramagnetic medium represents a carrier medium for the purpose of receiving the magnetically soft element, wherein the function of the medium as a carrier is advantageous in particular in the case of a single component embodiment of the diamagnetic or paramagnetic medium. It is preferred that the magnetically soft element can be fixed in a very simple manner to the rotor shaft in the axial direction with the aid of the diamagnetic or paramagnetic carrier medium.

Metal end discs that are known from the prior art for the purpose of fixing a magnetically soft element of this type to the rotor axis are superfluous and can be entirely replaced by means of the diamagnetic or paramagnetic medium being used. In particular, end discs that are embodied from the diamagnetic or paramagnetic medium can be formed on the end surfaces of the cylindrical, magnetically soft element and said end discs are used for the purpose of fixing the magnetically soft element to the rotor shaft in the axial direction.

The preferred embodiment of the rotor in accordance with the invention renders it possible for the magnetic barrier effect to be achieved and also for the process of axially fixing the magnetically soft element to be performed by means of a single component, i.e. the diamagnetic or paramagnetic carrier medium. As a consequence, the diamagnetic or paramagnetic carrier medium together with the magnetically soft element forms the two single components of the composite rotor in accordance with the invention.

In a preferred embodiment of the rotor in accordance with the invention, the magnetically soft element is a lamination stack that—as is known from the prior art—is constructed from several metal sheets that are stacked one on top of the other in the axial direction of the rotor. This construction prevents the occurrence of eddy currents in the magnetically soft element. An alternative method is available, whereby the magnetically soft element being used is produced in accordance with a powder-metallurgical method.

The lamination stack comprises individual metal lamina, wherein each individual metal lamina comprises along the q-axis several flux barriers that are filled with a diamagnetic or paramagnetic medium. In particular, one construction of the lamination stack is disclosed in U.S. Pat. No. 5,818,140 which is explicitly referred to in this context. In accordance with the teachings of the present invention, the corresponding cut-outs, in other words the flux barriers that are formed, are then filled with a diamagnetic or a paramagnetic medium in lieu of air.

It is preferred that at least two adjacent metal sheets of the lamination stack can be arranged spaced apart with respect to one another in the axial direction. In this case, it is possible for the intermediate space that is formed between the adjacent metal laminae to be filled at least in part by means of the diamagnetic or paramagnetic medium. This preferred construction of the rotor increases the stability of the rotor during operation. The radial forces that occur on the motor are absorbed by means of the diamagnetic or paramagnetic carrier medium. It is not necessary to provide radial supporting ribs that are frequently used within the individual metal sheets and that were hitherto necessary in specific embodiments for the purpose of radially reinforcing the lamination stack.

It is preferred that the diamagnetic or paramagnetic carrier medium fills the entire cylindrical intermediate space between individual metal sheets in a continuous manner.

It is possible that in each case two metal sheets are arranged spaced apart with respect to one another in regular spacings in the axial direction of the lamination stack in order to provide additional space for the diamagnetic or paramagnetic medium.

It is likewise feasible that the spaced arrangement of the two adjacent metal sheets is achieved by means of inserting a distance element. It is preferred that annular distance elements are used, wherein the intermediate space that lies in the radial direction above the distance elements is filled by means of the diamagnetic or paramagnetic carrier medium.

A modified metal lamina of the magnetically soft element is also feasible, wherein a tangential section of the magnetically soft element that is missing in the region of the q-axis on the outer circumference is completed by means of the diamagnetic or paramagnetic medium. As a consequence, the portion of space of the magnetically soft element that is missing from the full cylinder is likewise formed by means of the diamagnetic or paramagnetic carrier material.

Magnetically soft element parts lie between, in each case, two adjacent cut-outs along the q-axis of the magnetically soft element and said magnetically soft element parts are generally connected to one another in a magnetically conductive manner. In a particularly preferred embodiment of the invention, the conductive magnetically soft element parts that are formed between, in each case, two flux barriers are connected one to the other in a magnetically non-conductive manner. As a consequence, the difference of the permeability along the d-axis and the q-axis is further increased. In this case, the process of radially and axially fixing the magnetic elements is entirely performed by means of the diamagnetic or paramagnetic carrier material.

The diamagnetic or paramagnetic medium being used preferably comprises polymers and/or duromers and/or ceramic and/or glass and/or wood.

The invention further relates to a method for producing a rotor according to an above described embodiment. In accordance with the invention, the magnetically soft, cylindrical element is constructed in a first method step, and in a second method step, the diamagnetic or paramagnetic medium is introduced into or rather attached around the constructed magnetically soft element by means of a primary forming production method.

By way of example, in the case of the embodiment of the magnetically soft element as a lamination stack, in a first method step, a multiplicity of identical metal sheets are stacked one on top of the other in the axial direction. In the second method step, the diamagnetic or paramagnetic medium is introduced into the cut-outs of the individual metal sheets by means of the primary forming production method, in particular injection molding, wherein, where necessary, end discs are likewise formed from the diamagnetic or paramagnetic medium for the purpose of fixing the lamination stack to the rotor axis. It is expedient if the necessary diamagnetic or paramagnetic medium is entirely embedded in a cast in the lamination stack and as a consequence, only represents a single component. The diamagnetic or paramagnetic medium that extends through the lamination stack achieves both the magnetic barrier effect and also performs the process of axially fixing the lamination stack. In cooperation with the lamination stack, the resulting composite rotor is constructed from only two individual components.

In a similar manner to this, the rotor in accordance with the invention is produced on the basis of a material that is produced in accordance with a powder-metallurgical method. Initially, the desired form of the magnetically soft, cylindrical element is formed by means of the material, wherein likewise corresponding cut-outs are provided. The cut-outs are filled in a second method step with the diamagnetic or paramagnetic medium.

Furthermore, the present invention relates to the use of the rotor in accordance with the invention, in particular according to one of the above mentioned advantageous embodiments, in a reluctance machine, in particular in a synchronous reluctance machine.

Furthermore, the invention is intended for use in a reluctance motor, in particular a synchronous reluctance motor, said reluctance motor being equipped with the rotor in accordance with the invention, in particular the rotor in accordance with one of the above mentioned advantageous embodiments. The reluctance motor evidently comprises the same characteristics and advantages as the rotor in accordance with the invention in accordance with any of the advantageous embodiments and for that reason a description is not repeated at this point.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1 to 4 illustrate different sectional views of a metal lamina of the lamination stack that is used in a rotor in different embodiments of the invention.

FIGS. 5 and 6a-6b illustrate side views of the rotors illustrated in the FIGS. 1 to 3, and FIG. 7 illustrates a sectional view of a further embodiment of the rotor in accordance with the invention.

DETAILED DESCRIPTION

FIG. 1 illustrates a quadrant of a metal lamina of the rotor in accordance with the invention for a reluctance motor. For the purpose of simplifying the illustration, the stator is not illustrated. The metal rotor sheet 1 comprises several cut-outs 2 that perform the function of blocking the flux and a four-pole rotor is formed by means of the arrangement of the several cut-outs and the magnetic flux of the four-pole rotor is inhibited in the regions having the flux barriers 2. In general, the region having a high magnetic conductivity is designated as the d-axis and the region having the low magnetic conductivity is designated as the q-axis. For clarity, it should be noted that the remaining quadrants of the metal lamina are embodied in a manner that is identical to the quadrant that is illustrated.

Several metal rotor sheets 1 having the illustrated metal lamina are stacked in the direction of the axis of rotation 5 in a lamination stack that is fastened to a rotor shaft 3.

In accordance with the invention, a diamagnetic or paramagnetic medium 11 is introduced in lieu of air into the individual cut-outs 2 and said medium comprises by way of example polymers and/or duromers and/or ceramic and/or glass and/or wood. As a result of selecting a diamagnetic medium, it is possible for the difference of the permeability along the two axes d, q to be increased. Furthermore, the diamagnetic or paramagnetic medium that is introduced acts as a carrier medium that receives the individually stacked lamination stacks and fixes said lamination stacks to a rotor shaft 3.

The medium 11 can also be expanded in order to reduce its inertia and therefore to improve the operating characteristics of the rotor. Simultaneously, a metal coating on the flux barriers can render it possible to improve the flux conduction.

FIG. 5 illustrates a side view of a rotor in accordance with the invention, wherein the lamination stack 4 is composed of a multiplicity of individual metal laminae 1 in accordance with FIG. 1. The lamination stack 4 assumes overall a cylindrical form, wherein an end disc 6 is arranged in each case at the ends in the axial direction of the lamination stack 4, said end disc being likewise produced from the diamagnetic or paramagnetic medium 11. These end discs 6 are used for the purpose of fixing the lamination stack 4 to the rotor shaft 3 in the direction of the rotor axis 5.

It is particularly advantageous if the diamagnetic or paramagnetic medium 11 represents a single combined component that extends through all the cut-outs 2 of the individually stacked metal laminae 1 and additionally forms the two end discs 6. Accordingly, the rotor in accordance with the invention only comprises two components, in other words the diamagnetic or paramagnetic carrier medium 11 and also the lamination stack 4, wherein the carrier medium 11 achieves both the magnetic blocking effect and also performs the process of axially fixing the lamination stack 4 along the rotor axis 5.

As is evident in FIG. 1, the metal lamina that is illustrated therein comprises a radial supporting rib 7 that sub-divides the first cut-out 2a in the radial direction starting from the rotor shaft 3. Radial supporting ribs 7 of this type are necessary in specific embodiments for radially reinforcing the lamination stack 4.

In the embodiment in accordance with FIG. 2, a radial supporting rib 7 of this type is omitted. The prerequisite for this purpose is that the radial forces that act upon the lamination stack 4 can instead be absorbed by means of the diamagnetic or paramagnetic carrier medium 11 in order to supply sufficient stability for the rotor. For this purpose, the axial stacking of the metal sheets 1 is interrupted in regular spacings by means of annular distance elements 9 (see FIG. 6a) having definable outer diameters. Additional space is thus created for the diamagnetic or paramagnetic carrier medium 11 in the radial direction above the distance elements 9.

FIG. 6a illustrates a side view of a part section of the lamination stack 4, wherein the individual metal laminae 1 are embodied in accordance with the embodiment in FIG. 2. Furthermore, two individual distance rings 9 are evident and said distance rings arrange in each case two adjacent metal laminae 1', 1", 1'", 1"" spaced apart with respect to one another on the rotor axis 5.

The cylindrical space that is formed in the radial direction above the distance elements 9 to the outer circumference of the lamination stack 4 is entirely filled by means of the diamagnetic or paramagnetic medium 11 until said space closes with the outer diameter of the adjacent metal laminae 1', 1", 1'", 1"".

FIG. 6b illustrates the rotor that is formed from the metal laminae 1 in accordance with FIG. 2 in a side view. The diamagnetic or paramagnetic medium 11 completes the cylindrical form of the rotor.

FIG. 3 illustrates a further possible embodiment of the rotor in accordance with the invention having a modified metal lamina 1. In this case, the tangential metal lamina section 12 is entirely removed on the outer circumference near to the q-axis. The space section that is missing from the full cylinder is completed by means of the diamagnetic or paramagnetic carrier material 11. The side view of the constructed composite rotor corresponds to the drawing in FIG. 6b.

A further modification of the metal lamina 1 is evident in FIG. 4. In addition to the cut-out of the tangential metal lamina section 12 in accordance with FIG. 3, the metal lamina section 13 is also removed on the outer circumference between the individual magnetically conductive rotor elements 14 that lie along the q-axis. As a consequence, the rotor comprises along the q-axis a multiplicity of individual magnetic elements 14 that are connected to one another in a magnetically non-conductive manner but nonetheless comprise individual metal sheets. As a consequence, the permeability along the q-axis is further reduced and the difference with respect to the d-axis is advantageously increased. The radial and axial fixing of the magnetically soft material of the metal laminae 1 or rather of the lamination stack 4 is entirely performed by means of the diamagnetic or paramagnetic carrier material.

A modification of the exemplary embodiment in FIG. 4 is evident in FIG. 7. The difference with respect to FIG. 4 resides in the fact that the individual magnetically conductive rotor elements 14 all comprise a row of protrusions 20, 21 that engage in corresponding cut-outs in the carrier material 11 for the purpose of forming a positive-locking fit.

The protrusions can be embodied as trapezoidal protrusions 20 for the purpose of receiving a dovetail connection or can comprise another suitable form for forming a positive-locking fit, by way of example a toothed- or rather triangular-like form 21. The manner in which the protrusions 20, 21 and the cut-outs are formed can of course be interchanged or alternated on the carrier material 11 and rotor element 14.

In addition, it is to be added that the individual embodiment variants of the FIGS. 1 to 4 of the rotor in accordance with the invention can be readily embodied by means of using a material that is produced in accordance with a powder-metallurgical production method as a magnetically soft element. The form of the individual lamination stacks 4 in accordance with FIGS. 1 to 6 can be entirely reproduced by means of a corresponding material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rotor for an electrical machine, comprising:
a magnetically soft element having an even number of magnetic poles of the rotor and cut-out portions arranged as magnetic flux barriers of the rotor, the magnetically soft element including a plurality of laminations co-axially arranged in a lamination stack on a rotor rotation axis;
at least one distance element arranged on the rotor rotation axis axially between two adjacent ones of the plurality of laminations; and
at least one of a diamagnetic and paramagnetic medium arranged to at least in part fill the cut-out portions of the rotor,
wherein
the distance element has an outer radius smaller than an outer radius of the adjacent laminations,
the magnetically soft element, the at least one of the diamagnetic and the paramagnetic medium and the at least one distance element are configured to cooperate with one another to form a substantially cylindrical rotor shape, with an annular intermediate space between the outer radius of the at least one distance element and the outer radius of the two adjacent laminations being at least partially filled by the at least one of the diamagnetic and the paramagnetic medium such that the medium in the intermediate space is linked to the medium in the cut-out portions exposed to the intermediate space.

2. The rotor as claimed in claim 1, wherein the diamagnetic and/or paramagnetic medium is a single component of the rotor.

3. The rotor as claimed in claim 2, wherein the diamagnetic and/or paramagnetic medium is a carrier of the magnetically soft element and is arranged to fix the magnetically soft element to a rotor shaft of the rotor in an axial direction along the rotor axis.

4. The rotor as claimed in claim 3, wherein the diamagnetic and/or paramagnetic medium includes at least one end disc portion arranged to fix the magnetically soft element in the axial direction along the rotor axis.

5. The rotor as claimed in claim 1, wherein the magnetically soft element is formed from a material produced from a powdered metal.

6. The rotor as claimed in claim 1, wherein a tangential section of the magnetically soft element is at least in part filed in a q-axis region of the rotor by the diamagnetic and/or or paramagnetic medium at an outer circumference of the rotor.

7. The rotor as claimed in claim 6, wherein at least two regions of the magnetically soft element lie adjacent to one another on the q-axis and are magnetically non-conductively connected to one another.

8. The rotor as claimed in claim 1, wherein the diamagnetic and/or paramagnetic medium comprises at least one of a polymer, a duromer, a ceramic, a glass and a wood material.

9. A method for producing a rotor, comprising the acts of:
forming a magnetically soft, cylindrical element having an even number of magnetic poles of the rotor and cut-out portions arranged as magnetic flux barriers of the rotor having cut-out portions by assembling a plurality of laminations co-axially into a lamination stack with at least one distance element arranged co-axially between two adjacent ones of the plurality of laminations, the at least one distance element having an outer radius smaller than an outer radius of adjacent ones of the plurality of laminations, the lamination stack forming a rotor core configured to rotate on a rotation axis of a rotor shaft of the rotor; and
at least in part filing the cut-out portions and an annular intermediate space between the outer radius of the at least one distance element and the outer radius of the two adjacent laminations with at least one of a diamagnetic and a paramagnetic medium such that the medium in the intermediate space is linked to the medium in the cut-out portions exposed to the intermediate space,
wherein the magnetically soft element, the at least one of the diamagnetic and the paramagnetic medium and the at least one distance element cooperate with one another to form a substantially cylindrical rotor shape.

10. The method for producing a rotor of claim 9, wherein the at least one of the diamagnetic and the paramagnetic medium is added to the magnetically soft, cylindrical element by injection molding.

11. An electrical machine having the rotor claimed in 1.

12. The electrical machine of claim 11, wherein the electrical machine is a synchronous-reluctance machine.

13. The method for producing a rotor of claim 9, wherein the magnetically soft element is formed from a material produced from a powdered metal.

\* \* \* \* \*